No. 640,183. Patented Jan. 2, 1900.
S. R. DRESSER.
FRICTION PIPE COUPLING.
(Application filed Apr. 7, 1899.)
(No Model.) 2 Sheets—Sheet 2.
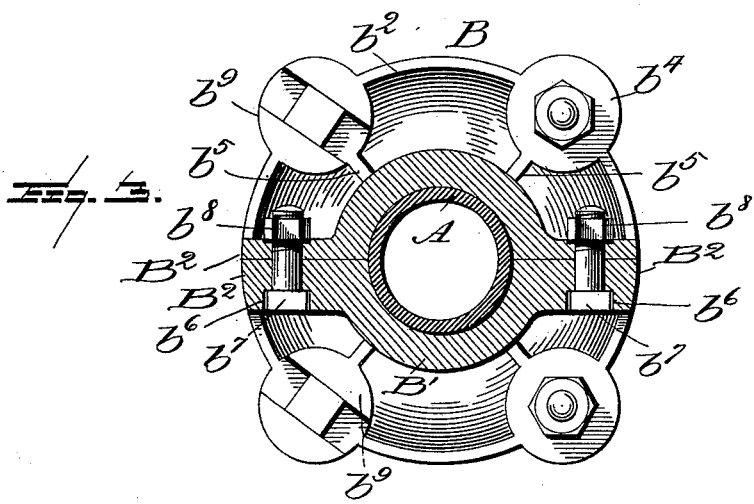
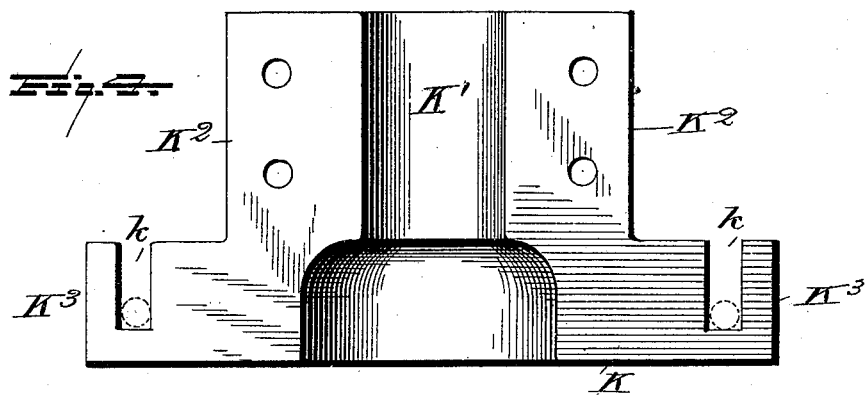
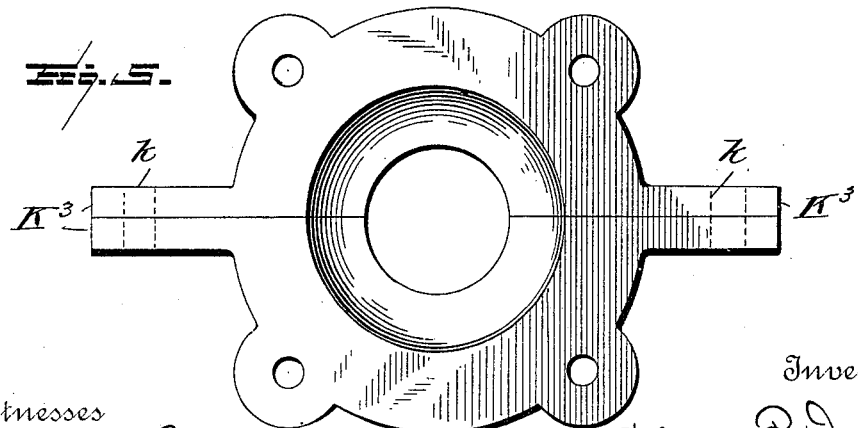
Witnesses
L. C. Hills.
J. D. Kingsbury
Inventor
Solomon R. Dresser
By Whitaker Prevost Attorneys.
THE NORRIS PETERS CO., PHOTO-LITHO., WASHINGTON, D. C.

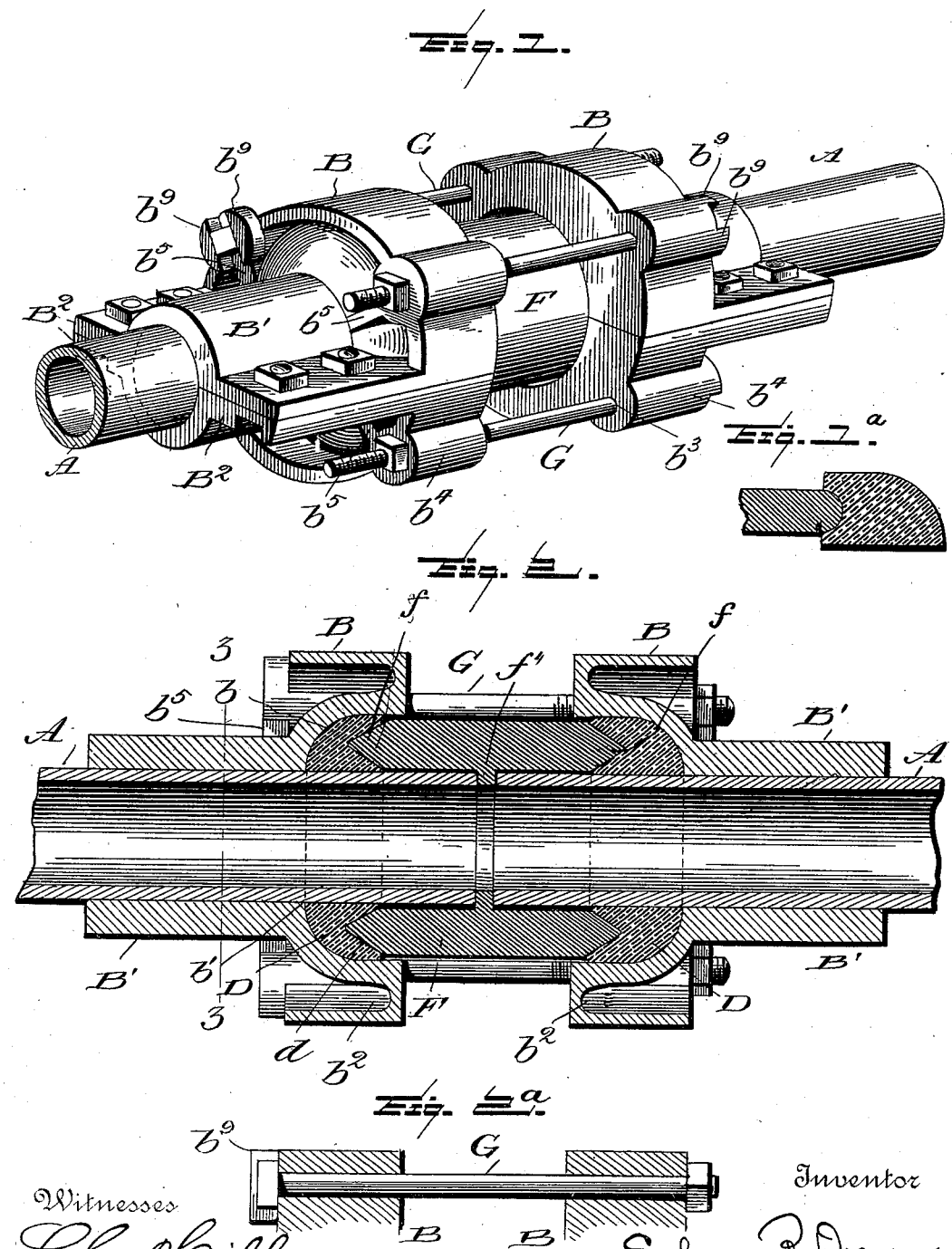

UNITED STATES PATENT OFFICE.

SOLOMON R. DRESSER, OF BRADFORD, PENNSYLVANIA.

FRICTION PIPE-COUPLING.

SPECIFICATION forming part of Letters Patent No. 640,183, dated January 2, 1900.

Application filed April 7, 1899. Serial No. 712,126. (No model.)

*To all whom it may concern:*

Be it known that I, SOLOMON R. DRESSER, a citizen of the United States, residing at Bradford, in the county of McKean and State of Pennsylvania, have invented certain new and useful Improvements in Friction Pipe-Couplings; and I do hereby declare the following to be a full, clear, and exact description of the invention, such as will enable others skilled in the art to which it appertains to make and use the same.

My invention is an improvement in pipe-couplings; and it consists in the novel features hereinafter described, reference being had to the accompanying drawings, which illustrate one form in which I have contemplated embodying my invention, and said invention is fully disclosed in the following description and claims.

Referring to the drawings, Figure 1 represents a perspective view of the meeting ends of two sections of wrought-iron or other pipe connected by my improved coupling. Fig. 1$^a$ is a detail sectional view of a portion of a coupling-sleeve and packing-ring, showing a modified construction. Fig. 2 is a longitudinal sectional view of my coupling applied to the meeting ends of two pipe-sections. Fig. 2$^a$ is a detail view of portions of the two clamping rings or plates and one of the clamping-bolts. Fig. 3 is a transverse section on line 3 3 of Fig. 2. Fig. 4 is a detail view of one half of a coupling-flange embodying a slight modification of my invention. Fig. 5 is an end view of the said modified form of flange, showing both parts.

The object of my invention is to provide a coupling which will unite the plain unthreaded ends of very large sizes of pipes and which will be strong enough to stand high internal pressures and which will also allow for a slight longitudinal movement of the pipes due to contraction and expansion caused by changes in temperature.

In the drawings, Figs. 1, 2, and 3, A A represent the adjacent ends of two sections of pipe, said ends being plain or unthreaded, and which are united by my improved coupling.

B B represent the clamping-plates, and as they are identical in construction a description of one will suffice for both. Each of these plates is provided on its inner face with a central cup-shaped recess $b$ and a central aperture $b'$, of less diameter than said recesses and concentric therewith, for the passage of the pipe-section. The portion of the plate between the recess $b$ and the outer edge is preferably cored out, as indicated at $b^2$, to lighten the plate. The plate is provided with a series of bolt-holes $b^3$, preferably four in number, which are reinforced to strengthen the plate at these points, the walls $b^4$ of the bolt-holes extending outwardly beyond the edge of the plate and inwardly into the cored portion of the same, and I prefer also to connect said walls with the walls of the recess $b$ by radial webs $b^5$, as shown, to insure the proper strength of the plate. The plate B is also provided on its outer side (the side farthest from the opposing plate of the coupling) with a cylindrical portion or sleeve B', which extends over and around a considerable portion of the pipe. On opposite sides of this sleeve portion I provide laterally-extending flanges B$^2$ B$^2$, which extend outwardly as far as the outer edges of the plate and are formed integrally therewith. In order to facilitate placing the plate upon the end of a pipe-section, the plate is made in two parts, being divided on a plane parallel with the faces of the flanges B$^2$ B$^2$ and between the faces of said flanges, so that each part of the plate is provided with a section of the plate proper and a section of the sleeve, with the flanges extending on each side. In order to secure the parts of the plate together, the parts of the flanges B$^2$ B$^2$ are bolted together, as shown. I prefer to provide the flanges on one part of the plate with grooves or recesses $b^6$ $b^6$ to receive the squared heads of the clamping-bolts $b^7$ $b^7$, so that the bolts are prevented from turning while the nuts $b^8$ $b^8$ are being tightened. The two parts of the plate are placed upon a pipe-section A adjacent to the end and are clamped together upon the pipe by the bolts $b^7$ and nuts $b^8$, so that the parts of the plate are secured together and the plate is clamped upon the pipe-section. I prefer, however, that the coupling-plate should not be clamped upon the pipe so tightly as to prevent the movement of the pipe longitudinally through the plate, and I have found that the parts of the plate can be forced together upon the pipe with considerable pressure without preventing this movement of the pipe under the action of heat and cold, which cause a certain amount of expansion and contraction in each pipe-section.

D represents a packing-ring which is formed of rubber or other suitable material to fit the cup-shaped recess $b$ of the coupling-plate and has its exterior face provided with an annular groove $d$, preferably V-shaped in cross-section, as shown. The ring D is provided with a central aperture adapted to fit tightly over the pipe-section A.

F represents the coupling-sleeve, which is cylindrical and of an external diameter slightly less than that of the recess $b$ in the coupling-plates and of an internal diameter slightly greater than the external diameter of the pipe. At each end this sleeve is provided with annular tapering or wedge portions $f$, V-shaped in cross-section, which fit within the annular recesses of the packing-rings D, and said sleeve is preferably provided interiorly with a central inwardly-extending annular rib $f'$ or a series of annularly-arranged projections to serve as a stop for the adjacent ends of the pipe-sections. The end portions of the coupling-sleeve and the annular grooves in the packing-rings may be rounded instead of angular, if desired, as indicated in Fig. 1$^a$.

In assembling the parts of my improved coupling to connect adjacent ends of two pipe-sections A A one of the coupling-plates B is secured to each of said sections near the meeting ends, as previously described, and a packing-ring D is slipped over each pipe end and into one of the recesses $b$ of said plates. The sleeve F is then placed over the meeting ends of the pipe-sections, and its annular wedge-shaped end portions are made to engage the annular grooves $d$ $d$ in the packing-rings D D. The coupling-bolts G G are passed through the bolt-holes $b^3$ from one plate to another, and nuts thereon are turned up, thus drawing the two plates toward each other and clamping the sleeve F between them. The heads of the bolts G G are preferably square or oblong, and I prefer to provide each coupling-plate, adjacent to a part of its bolt-holes, with flanges $b^9$ to engage the bolt-heads and prevent the said bolts from turning. In this way part of the bolts (of which there may be any desired number) can be inserted from each end of the coupling, and I am thus enabled to cast both coupling-plates alike.

The coupling-plates have a long bearing on the pipe-sections owing to the clamping-sleeves and lateral flanges, and said plates are adapted to stand very great strain without bending or breaking. This form of coupling can therefore be used with great advantage on large sizes of pipe and those subjected to high internal pressure, and my coupling unites the ends of pipes perfectly without the necessity of threading or treating the ends of the pipes in any way.

In Figs. 4 and 5 I have shown a slight modification of the form of my coupling-plates in which the plate K is provided with the sleeve portion $K^7$ and flange $K^2$, as previously described with reference to that shown in Figs. 1, 2, and 3, and in addition thereto with lateral flanges $K^3$ $K^3$, extending from and beyond the edge of the plate proper and having their forward edges flush with the inner face of the plate. These flanges $K^3$ $K^3$ are formed integrally with the edge of the plate proper and with the flanges $K^2$ $K^2$. This coupling is formed in two parts also, and the two parts of flanges $K^2$ $K^2$ are to be united by bolts, as in the form shown in Figs. 1, 2, and 3. The two parts of the flanges $K^3$ $K^3$ are also to be united by bolts, and I prefer to cast said flanges with open-ended slots $k$ therein, as shown in Fig. 4, instead of circular bolt-holes to facilitate the casting of the plates.

What I claim, and desire to secure by Letters Patent, is—

1. In a pipe-coupling, a coupling plate or ring provided with an aperture for the passage of a pipe therethrough, and a sleeve portion extending perpendicularly to the main body of said plate or ring, said plate or ring being divided in a plane passing through said sleeve portion, parallel to the axis thereof, means for drawing the parts of said sleeve portion together to clamp it frictionally upon a pipe-section, said ring or plate being provided with means for engaging coupling-bolts, substantially as described.

2. In a pipe-coupling, a coupling plate or ring provided with means for engaging coupling-bolts, a central pipe-receiving aperture, a sleeve portion extending perpendicularly to the main body of said plate or ring, and lateral flanges connecting said sleeve portion and the main body of the ring or plate said plate or ring being formed in two parts divided in a plane passing through flanges on opposite sides of said sleeve portion parallel to the faces of said flanges and clamping devices engaging the parts of said flanges for clamping the sleeve portion upon a pipe-section, substantially as described.

3. The combination with the meeting ends of two pipe-sections, of a coupling-plate surrounding each section and provided with clamping-surfaces, elongated longitudinally of the pipe for frictionally engaging the same, means connected with each of said plates for clamping said surfaces upon the pipe but permitting the longitudinal movement of the pipe-section therethrough, a packing-ring in each of said plates surrounding the pipe-section, a coupling-sleeve engaging said rings and devices for drawing said plates together, substantially as described.

4. A pipe-coupling comprising among its members a pair of coupling-plates adapted to surround sections of pipes, each plate having the portion engaging the pipe divided, clamping means for forcing said divided portions together upon the pipe, a packing-ring carried by each of said plates, a coupling-sleeve for surrounding the meeting ends of two pipe-sections, adapted to engage said packing-rings, and coupling devices for drawing said plates together, substantially as described.

5. A pipe-coupling comprising among its members, a pair of coupling-plates each being provided with laterally-extending portions, a sleeve portion for surrounding a pipe provided with laterally-extending flanges uniting said sleeve portion and said laterally-extending portions, packing-rings carried by said plates, a coupling-sleeve adapted to engage said packing-rings and to inclose the meeting ends of two pipe-sections and coupling devices for engaging the laterally-extending portions of said plates and drawing said plates together, substantially as described.

6. A pipe-coupling comprising among its members, a pair of coupling-plates each provided with laterally-extending portions, a sleeve portion adapted to engage a pipe-section and lateral flanges connecting said sleeve portion and said laterally-extending portion, said plates being each formed in two parts, divided in a plane passing through said flange and parallel with the faces thereof, clamping devices for engaging said flanges, for clamping the sleeve portion upon a pipe-section, the coupling-sleeve, packing-rings interposed between said sleeve and said plates, and coupling devices engaging the laterally-extending portions of said plates for drawing them together, substantially as described.

7. A pipe-coupling comprising among its members, a pair of coupling-plates, each plate being composed of two parts provided each with a laterally-extending portion, a semicylindrical sleeve portion for engaging a pipe-section and flanges connecting the sleeve portion and said laterally-extending portions, said plates having each a central packing-recess, packing-rings for said recesses provided each with an annular groove, a coupling-sleeve provided with annular end portions wedge-shaped in cross-section for engaging the grooves of the packing-ring, and coupling-bolts passing through the said laterally-extending portions of said plates for drawing said plates together, substantially as described.

In testimony whereof I affix my signature in the presence of two witnesses.

SOLOMON R. DRESSER.

Witnesses:
 GEO. P. BOOTHE,
 W. L. GRAHAM.